US006920244B2

(12) United States Patent
Rosen et al.

(10) Patent No.: US 6,920,244 B2
(45) Date of Patent: Jul. 19, 2005

(54) DATA-EFFICIENT AND SELF ADAPTING IMAGING SPECTROMETRY METHOD AND AN APPARATUS THEREOF

(75) Inventors: Mitchell Rosen, Rochester, NY (US); Noboru Ohta, Kanagawa (JP)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 09/972,223

(22) Filed: Oct. 5, 2001

(65) Prior Publication Data

US 2002/0090144 A1 Jul. 11, 2002

Related U.S. Application Data

(60) Provisional application No. 60/238,570, filed on Oct. 6, 2000.

(51) Int. Cl.[7] .................................................. G06K 9/00
(52) U.S. Cl. ...................................................... 382/162
(58) Field of Search ......................... 382/110, 162–167, 382/254–256, 270–272; 250/330.01–330.14

(56) References Cited

U.S. PATENT DOCUMENTS

| 5,467,271 | A |   | 11/1995 | Abel et al. |   |
|---|---|---|---|---|---|
| 5,764,819 | A |   | 6/1998 | Orr et al. |   |
| 5,878,356 | A |   | 3/1999 | Garrot, Jr. et al. |   |
| 5,920,831 | A |   | 7/1999 | Pringle et al. |   |
| 5,949,914 | A | * | 9/1999 | Yuen | ........................... 382/254 |
| 5,991,023 | A |   | 11/1999 | Morawski et al. |   |
| 6,031,619 | A |   | 2/2000 | Wilkens et al. |   |
| 6,211,971 | B1 | * | 4/2001 | Specht | ........................ 382/162 |

OTHER PUBLICATIONS

Maitre et al. "Spectrophotometric image analysis fo fine art paintings" Proc. 4th IS&T/SID Color Imaging Conf. 94, (1996).*
Berns et al. "Multi–spectral–based color reproduction research at the Munsell Color Science Laboratory" Proc. of SPIE Europto Series, Electronic Imaging: Processing, Printing, and Publishing in Color, vol. 3409, pp. 14–25, May 1998.*
Hill "Multispectral Color Technology: a way towards high definition color image scanning and encoding" Proc. of SPIE Europto Series, Electronic Imaging: Processing, Printing, and Publishing in Color, vol. 3409, pp. 2–13, May 1998.*
Miyake et al. "Development of multiband color imaging systems for recording of art paintings" IS&T/SPIE Conf. on Color Imaging: Device–Independent Color, Color Hardcopy, and Grapohic Arts IV vol. 3648, pp 218–225, Jan. 1999.*
H. Haneishi, et al., "Design Of Color Filters For Recording Artworks," IS&T's 50th Annual Conference, Cambridge, MA, pp. 369–372 (1997).
H. Sugiura, et al., "Development Of Highly Accurate Multispectral Camera," International Symposium On Multispectral Imaging And Color Reproduction For Digital Archives, Chiba, Japan, pp. 73–80 (1999).
F. Imai et al., "Spectral Estimation Using Trichromatic Digital Cameras," International Symposium On Multispectral Imaging And Color Reproduction For Digital Archives, Chiba, Japan, pp. 42–49 (1999).
S. Toyooka, et al., "Low–Dimensional Multispectral Image Analyzing System With Optimized Broad–Band Filters," Submitted To Second International Symposium On Multispectral Imaging And High Accurate Color Reproduction, Chiba, Japan (2000).

* cited by examiner

*Primary Examiner*—Jingge Wu
(74) *Attorney, Agent, or Firm*—Nixon Peabody LLP

(57) ABSTRACT

A method for spectral imaging includes capturing high spectral resolution data of at least a portion of an image using a plurality of channels, determining a first set of channels from the plurality of channels which can reconstruct spectra of the portion of the image to within a first error tolerance from the captured high spectral resolution data, and capturing estimated spectral resolution data of the image using the first set of channels.

38 Claims, 5 Drawing Sheets

DATA-EFFICIENT AND SELF ADAPTING IMAGING SPECTROMETRY METHOD AND AN APPARATUS THEREOF

This application claims the benefit of U.S. Provisional Patent Application Ser. No. 60/238,570 filed Oct. 6, 2000.

FIELD OF THE INVENTION

The present invention relates to a method and system for capturing an image of a scene and, more particularly to a data-efficient and self adapting method and system for analyzing spectral data for use in a data efficient and self adapting spectral imaging method and system.

BACKGROUND OF THE INVENTION

Spectral imaging is based on capturing multiple channels of color data for each pixel in an image. Each channel is associated with a different spectral sensitivity signature. Spectral imaging with its multiple channels is distinguished from traditional imaging because the latter typically collects only three channels, usually red, green and blue. A properly calibrated spectral approach can maintain the reflectance or transmittance properties of scene objects or can detect the energy level of quanta which reach the detector for each pixel. Traditional imaging systems can not do this and are limited to describing color appearance of a scene under highly constrained environmental conditions. Thus, spectral imaging far exceeds traditional imaging in terms of flexibility, power and the ability to analyze scene contents.

Since spectral imaging systems are based on capturing multiple channels of color data, they capture and require the processing and storage of far more data than traditional imaging systems. As a result, spectral imaging systems are faced with data overload problems.

SUMMARY OF THE INVENTION

A method for spectral imaging in accordance with one embodiment of the present invention includes capturing high spectral resolution data from at least a portion of a scene using a plurality of channels, determining a first set of channels from the plurality of channels and an associated first set of parameters to a transform which can reconstruct spectra of the portion of the scene to within a first error tolerance from the captured high spectral resolution data, and capturing an image of the scene using the first set of channels from which original scene reflectance, transmittance or radiance may be estimated at high spectral resolution and high spatial resolution when the transform using the first set of parameters is applied to the captured image.

A system for spectral imaging in accordance with one embodiment of the present invention includes an imaging system, a spectral processing system and a data storage medium. The imaging system captures high spectral resolution data from at least a portion of a scene using a plurality of channels. The spectral processing system determines a first set of channels from the plurality of channels and an associated first set of parameters to a transform which can reconstruct spectra of the portion of the scene to within a first error tolerance from the captured high spectral resolution data, wherein the imaging system captures high spatial resolution image data of the scene using the first set of channels, and stores in the data storage medium the image data and the first set of transform parameters. Subsequently, the spectral processing system may retrieve the first set of parameters and image data from the digital storage medium and process the image data in accordance with the first set of transform parameters, resulting in estimates of the original scene reflectance, transmittance or radiance at high spectral resolution for each pixel of the image.

The present invention improves data overload problems previously associated with general spectral imaging as well as alleviating the tradeoffs between accuracy and generality associated with previous specialized spectral imaging. The present invention has recognized that for any particular object in a scene or for any scene in total there is one or more sets of channels which contain an optimally minimum number of channels and an associated transform which can be used for accurate spectral reconstruction of that object or scene. As a result, the present invention strives to approximate an optimal set of channels and to derive an optimal transform for every scene or portion of scene encountered. The extent to which optimums are realized is limited by the specifics of any particular system implementation. The number of channels in an optimal set could be as few as two or three or many more, depending upon the specific characteristics of an object or scene and the nature of the mathematical constructs of the transforms chosen for an implementation.

By addressing the data overload problem associated with the large number of channels needed with prior general spectral imaging systems, the present invention is able to increase the speed of data capture. Since the number of channels to be captured is limited, the amount of data to be moved through the system is likewise reduced allowing for faster imaging and faster subsequent image processing.

Additionally, by reducing the spectral data being captured in each image, the present invention has a higher storage capacity for images and lower bandwidth demands. Image compression requirements are reduced accordingly.

Further, since fewer channels are needed with the present invention, system complexity is reduced, system specifications are relaxed, manufacturing yield goes up all resulting in lower system cost.

Another advantage of the present invention is that it is both data efficient and general since it automatically chooses an appropriate low bandwidth configuration for every scene it encounters. Prior specialized spectral imaging systems with low bandwidth were fixed with a single configuration and thus for high accuracy they were restricted to imaging one particular class of objects for which they were customized.

DETAILED DESCRIPTION

Figure 1:
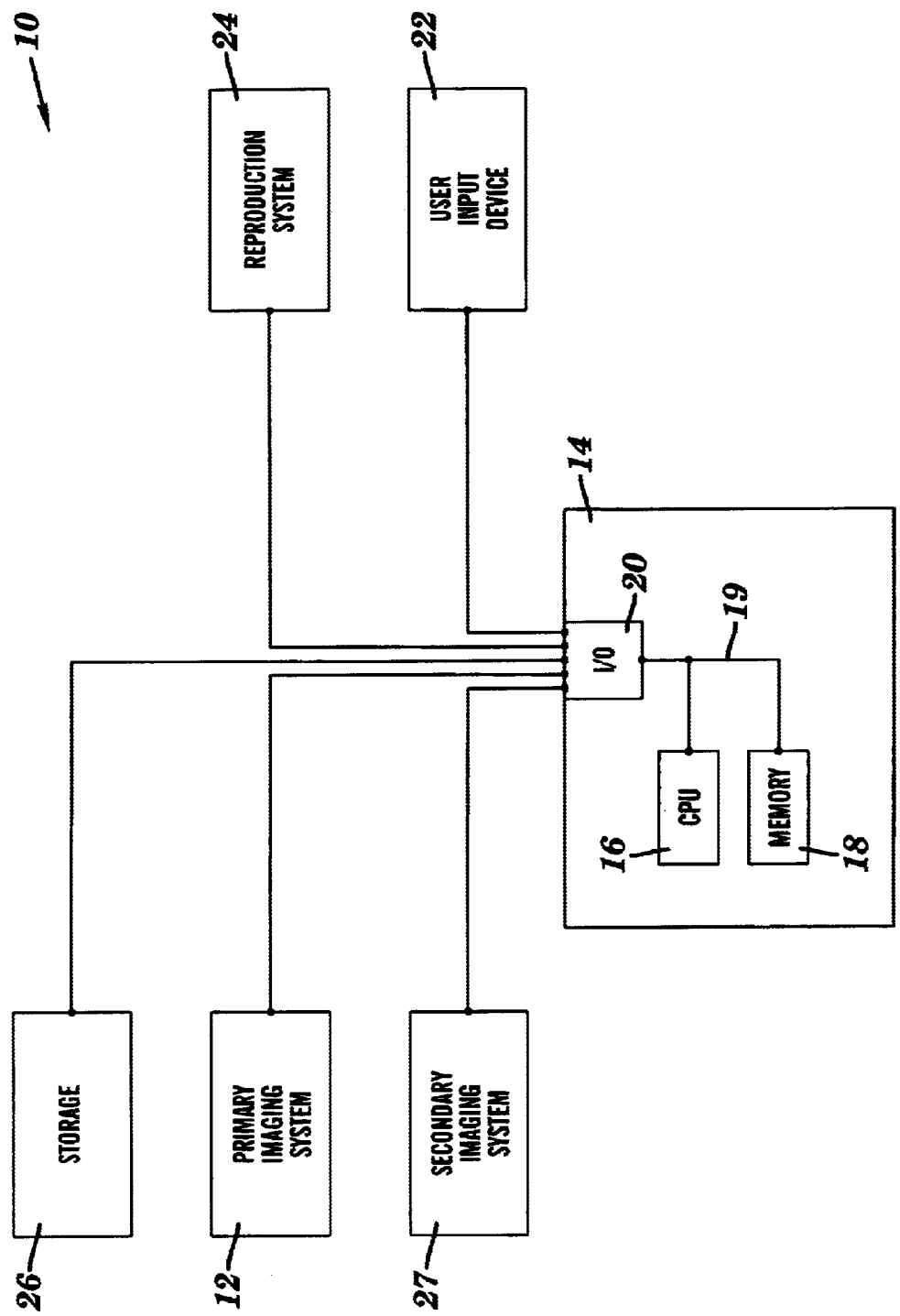
FIG. 1 is a block diagram of a spectral imaging system in accordance with the present invention.
Figure 2:
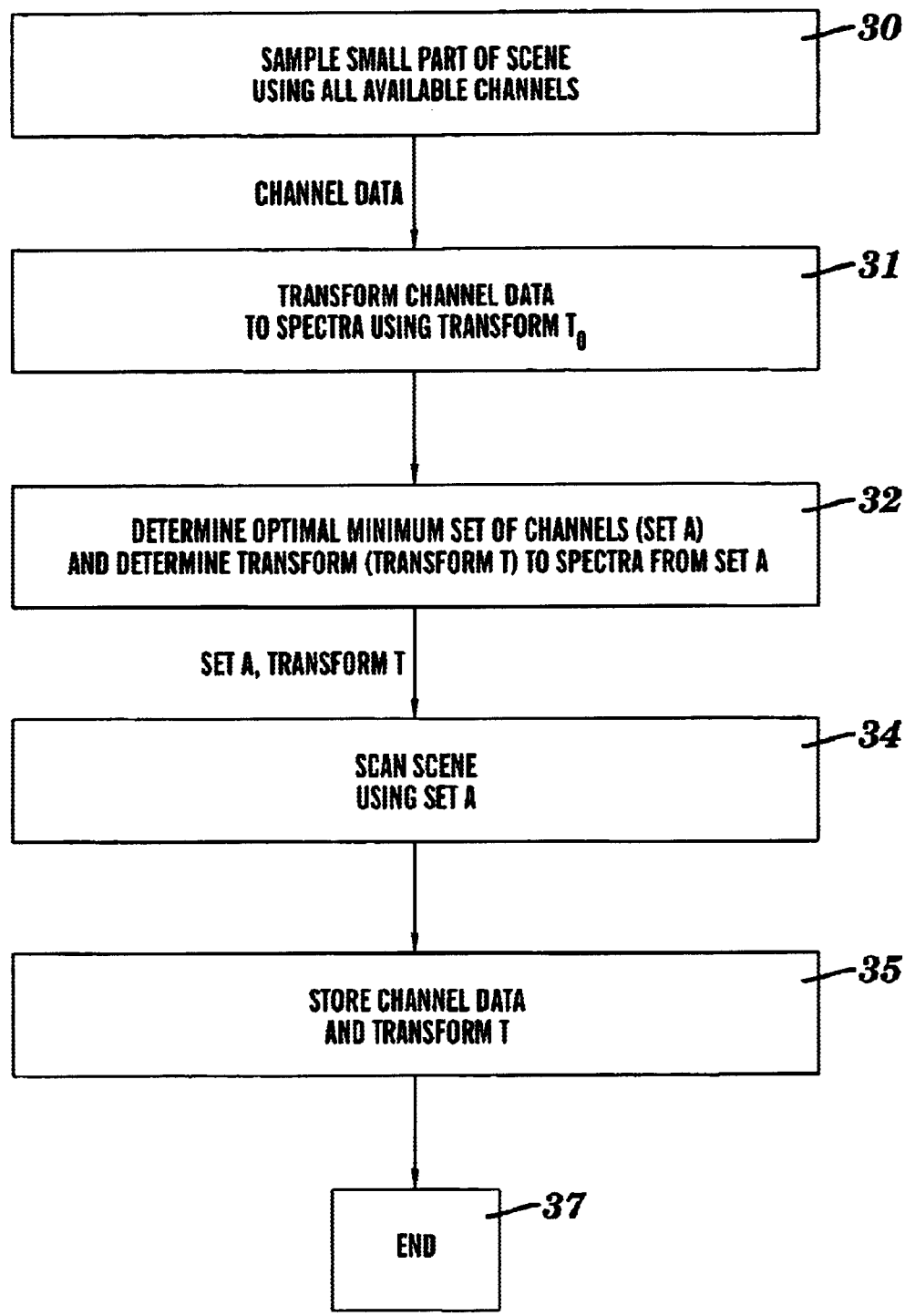
FIG. 2 is a flow chart of a method for spectral imaging in accordance with a first embodiment of the present invention.

A system 10 and method for the capture of still spectral images in accordance with one embodiment of the present invention is illustrated in FIGS. 1 and 2. The system 10 includes an imaging system 12 and a spectral processing system 14. The method includes capturing high spectral resolution data from at least a portion of a scene using a plurality of channels, determining a first set of channels from the plurality of channels and associated set of parameters to a first transform which can reconstruct spectra of the portion of the scene to within a first error tolerance from the captured high spectral resolution data, and capturing an image of the scene using the set of channels from which original scene reflectance, transmittance or radiance may be estimated at high spectral resolution and high spatial resolution when the transform using the set of parameters is applied to the captured image. The present invention improves data overload problems previously associated with spectral imaging by only taking the optimally minimum number of channels for every scene and adjusting the optimal set of channels being taken intermittently.

Referring more specifically to FIG. 1, in this particular embodiment the imaging system 12 is a spectral imaging system that captures multiple channels of color data for each pixel in an image, although other types of imaging systems can be used. The imaging system is coupled to and receives information and instructions, such as the particular channels of color data to capture, from the spectral processing imaging system 14. The imaging system 12 also transmits information and instructions, such as captured spectral data of an object or portion of a scene, to the spectral processing system 14. In this particular embodiment, the imaging system 12 comprises interference filters positioned in front of a photodetector or other imager to capture the channel data for the set of channels, set a, although imaging system 12 can comprise other components, such as absorption filters positioned in front of a photodetector or other imager, a tunable filter positioned in front of a photodetector or other imager, or a rewritable filter positioned in front of a photodetector or other imager. The particular channel being captured by the tunable filter or the rewritable filter can be synthesized by time and wavelength modulation of the tunable filter or the rewritable filter.

The spectral processing system 14 includes a central processing unit (CPU) 16, a memory 18, an input/output interface 20, and a user input device 22 which are coupled together by a bus system 19 or other link, although the spectral processing system may comprise other components, other numbers of the components, and other combinations of the components. The processor executes a program of stored instructions for the method for data efficient and self adapting spectral imaging in accordance with the present invention as described herein and illustrated in FIGS. 2 and 3. In this particular embodiment, those programmed instructions are stored in memory 18, although some or all could be stored and retrieved from other locations. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 16, can be used for memory 18. The input/output interface 20 is used to operatively couple and communicate between the spectral processing system 14 and the imaging system 12, the reproduction system 24, and the storage system 26. A variety of different types of connections and communication techniques can be used to transmit signals between the spectral processing system 14 and the imaging system 12, the reproduction system 24, and the storage system 26. The user input device 22 enables an operator to generate and transmit signals or commands to the processor 16, such as error tolerances A variety of different types of user input devices 22 can be used, such as a keyboard or computer mouse.

In this particular embodiment, reproduction system 24 is coupled to the spectral processing system 14 and is another imaging system, such as a printer or a display device, although other types of systems could be used. The reproduction system 24 recreates the captured image based on the estimated spectra reconstructed by applying a parameterized transform to the channels of image data for every portion of a scene received from the spectral processing unit.

In this particular embodiment, the digital data storage medium 26 is coupled to the spectral processing system 14 and is a memory storage device, such as a random access memory (RAM) or a read only memory (ROM) in the system or a floppy disk, hard disk, CD ROM, or other computer readable medium which is read from and/or written to by a magnetic, optical, or other reading and/or writing system, in a remote computer processing system. The storage system 26 can store spectral data from the spectral processing system 14 for retrieval and use at a later time.

System 10 may also include a secondary imaging system 27 that is a spectral imaging system with very little spatial extent, but very high spectral resolution, although other types of imaging systems configured in other manners can be used. The secondary imaging system 27 is coupled to and receives information and/or instructions from and transmits information and/or instructions to the spectral processing imaging system 14. Although an optional secondary imaging system 27 is shown, the primary imaging system 12 could also perform the functions of the secondary imaging system 27, so that only one imaging system is needed.

Referring to FIG. 2, a method for spectral imaging that is data efficient and self adapting in accordance with a first embodiment of the present invention will be described. In step 30, a portion or part of a scene using all available channels is captured by the imaging system 12 and transmitted to the spectral processing system 14. Typically, the imaging system 12 will have a plethora of channels available to it. The size of the portion of the scene captured can vary as needed or desired for the particular application.

In step 31, the spectral processing system 14 transforms the channel data captured by the primary imaging system 12 to spectra using a transform $t_0$. In this example, transform $t_0$ was previously derived and stored in memory 18, although in other implementations it can be made known to the system 10 through other means, such as in a user initiated calibration step. By applying transform $t_0$ to the channel data captured in step 30, highly accurate spectra for each pixel in the captured portion of the scene is derived.

In step 32, the spectral processing system 14 determines an optimally minimum set of channels which are referred to as, "set a" in this particular example. The spectral processing system 14 has a stored error tolerance, e, and also determines a second transform t which is used to transform the data to spectra for imaging. The spectral processing system 14 performs an iterative optimization determining a matrix which when applied to the captured pixel data from a set of channels, the closest reconstruction of the highly accurate spectra may be realized. The set with the smallest number of channels which can approximate the highly accurate spectra across all captured pixels within an average spectral RMS difference that is less than the error tolerance e is chosen as the optimal set. Transform t includes the derived matrix associated with this optimally minimum set of channels, set a. The spectral processing system 14 transmits instructions to imaging system 12 to capture the image using the optimally minimum set of channels, set a.

In step 34, the primary imaging system 14 captures the entire scene using the optimally minimum channel set, set a. The imaging system 12 transmits the multiple channel data captured using the optimally minimum set of channels, set a, to the spectral processing system 14. In step 35, the spectral processing system 14 stores the channel data and the transform t in storage 26, although the data and transform can be stored elsewhere, such as in memory 18. In step 37, the process ends.

Figure 3:
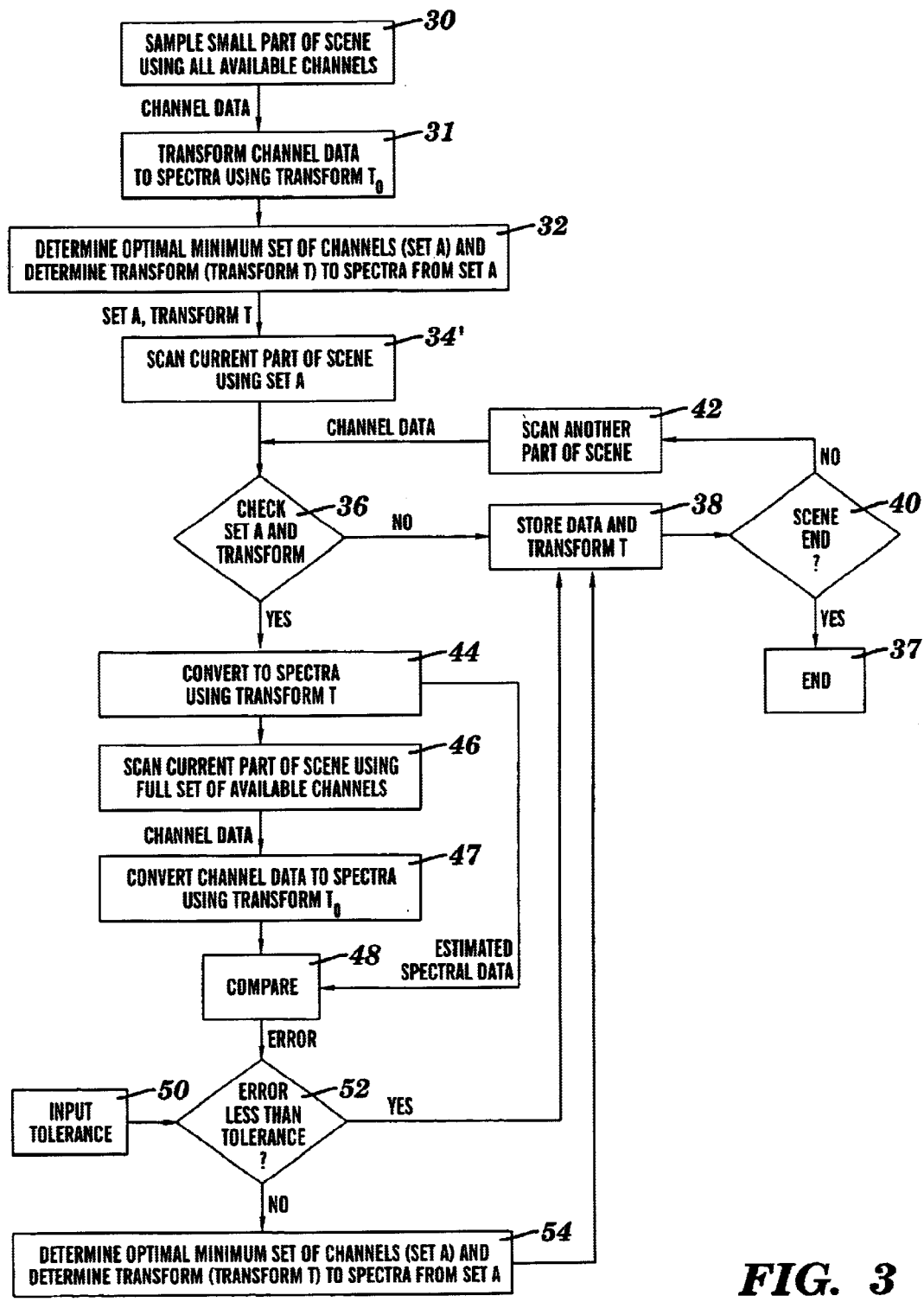
FIG. 3 is a flow chart of a method for spectral imaging in accordance with a second embodiment of the present invention.

A system 10 and method for spectral imaging in accordance with a second embodiment of the present invention is identical to the one described above and illustrated in FIGS. 1 and 2, except as described below and illustrated in FIG. 3. This second embodiment is more robust than the first embodiment of the present invention described above because it has the ability to update its filter and transform choices as it images a scene.

Steps 30–32 are the same as described above with reference to FIG. 2. In step 34' in FIG. 3 in this particular embodiment, the imaging system 14 captures a portion of the scene using the optimally minimum channel set, set a. The size of the image taken for this portion of the scene can vary as needed or desired by the particular application. The imaging system 12 transmits the multiple channel data captured using the optimally minimum set of channels, set a, to the spectral processing system 14.

In step 36, the spectral processing system 14 decides whether to check the results of the captured set of spectral data and the associated transform. In this particular embodiment, the check is carried out periodically at intervals entered in by the operator using user input device 20 or from preset intervals stored in instructions in memory 18, although other systems and methods for checking can be used, such as checking the captured spectral data randomly or at the request of an operator using the user input device 22.

If a check is not going to be performed by the spectral processing system 14 in step 36, then the No branch is taken to step 38. In step 38, the spectral processing system 14 stores the spectral data for the portion of the image or scene captured and the associated transform, t, in memory 18, although this information can be stored elsewhere, such as in storage system 26 or in reproduction system 24.

In step 40, the spectral processing system 14 determines whether the spectral imaging of the particular scene or scenes to be captured has ended. By way of example only, the operator using the user input device 22 may signal the spectral processing system 14 that spectral image capturing is completed. If the spectral imaging has ended, then the Yes branch is taken to step 37 where the method ends.

If the spectral imaging has not ended, then the No branch is taken from step 40 to step 42 where the imaging system 12 captures spectral data for the next portion of the scene using the current optimally minimum set of channels, set a. Once data for the next portion of the scene has been captured and transmitted to the spectral processing system 14, then the method goes back to step 36 to decide whether to check the results of the captured set of spectral data and the associated transform. Again, if a check is not going to be performed in step 36, then the No branch is taken to step 38 as described above.

If a check is going to be performed by the spectral processing system 14 in step 36, then the Yes branch is taken to step 44. In step 44, the spectral processing system 44 converts the captured data from the current optimally minimum set of channels, set a, for a current portion of the scene to estimate spectral data using the associated transform, t.

In step 46, the spectral processing system 14 instructs the imaging system 12 to capture the current portion of the scene using the full set of available channels. The imaging system 12 captures and transmits the data for the current portion using the full set of channels to the spectral processing system 14.

In step 47, the spectral processing system 14 uses the first transform, transform $t_0$, to create a highly accurate estimate of spectral data of this portion of the scene from the channel data captured using the full set of channels.

In step 48, the spectral processing system 14 compares these two estimates of spectral data through calculating an error which is the average RMS difference across all pixels captured in step 46.

In step 50, the operator can enter in a tolerance, e, for the error using the user input device 22 or the tolerance can be retrieved from a memory, such as memory 18, in spectral processing system 14. In step 52, the spectral processing system 14 determines whether the error is less than the tolerance e. If the error is less than the tolerance e, than the Yes branch is taken back to step 38 as described earlier and the spectral processing system 14 continues to use the current optimally minimum set of channels, set a, and the associated current transform, t.

If the error is not less than the tolerance e, then the No branch is taken back to step 54. In step 54, the spectral processing system 14 determines an updated optimal minimum set of channels which are assigned to set a and determines an updated transform, $t_n$. If an updated transform, $t_n$, is derived then the previous transform t is stored in such a way that the spatial relationship between it and prior captured image pixels is preserved.

Once step 54 is completed, then next the method and system go back to step 38 which was described earlier, except that the spectral processing system 14 now uses the updated optimally minimum set of channels, set a, and the associated updated transform, $t_n$. The new parameters will continue to be used in subsequent imaging until error conditions are found which call for yet another channel/transformation setup as described herein.

A system 10 and method for spectral imaging in accordance with a third embodiment of the present invention is identical to the one described above and illustrated in FIGS. 1 and 3, except as described below and illustrated in FIG. 4. This particular embodiment describes the use of the present invention in a method for spectral video or spectral cinema configuration. This particular embodiment also intermittently checks to see if a high level of spectral accuracy is being realized. If insufficient accuracy is being maintained a new set of channels and a new transform is used in the primary system.

Figure 4:
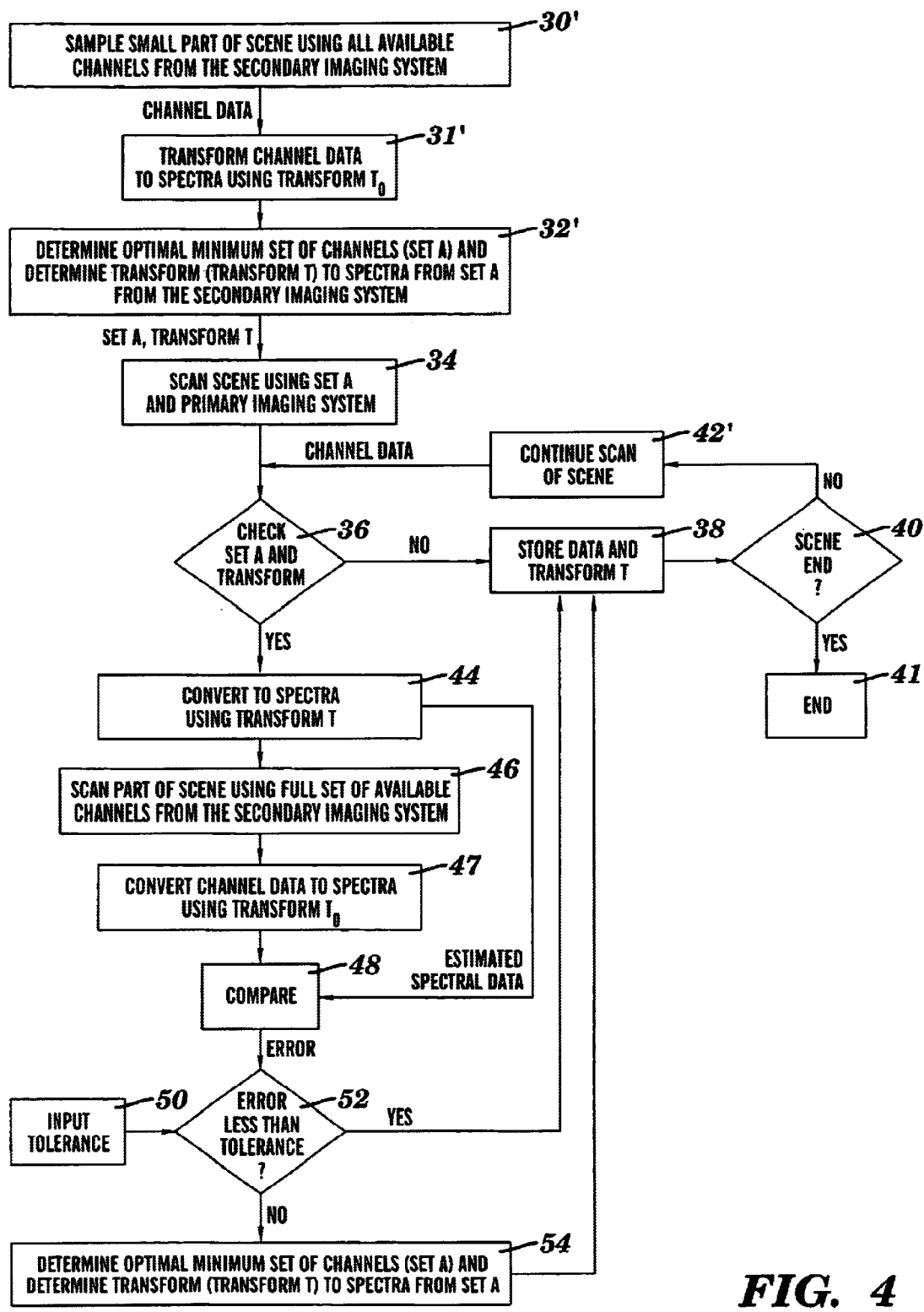
FIG. 4 is a flow chart of a method for spectral imaging in accordance with a third embodiment of the present invention.

Referring to FIG. 4, in step 30' a portion or part of a scene using all available channels is captured by the secondary imaging system 27 and transmitted to the spectral processing system 14. Typically, the imaging system 27 will have a plethora of channels available to it. The size of the portion of the scene captured can vary as needed or desired for the particular application.

In step 31', the spectral processing system 14 transforms the channel data captured by the secondary imaging system 27 to spectra using a transform $t_0$. In this example, transform $t_0$ was previously derived and stored in memory 18, although in other implementations it can be made known to the system 10 through other means, such as in a user initiated calibration step. By applying transform $t_0$ to the channel data captured in step 30', highly accurate spectra for each pixel in the captured portion of the scene is derived.

In step 32', the spectral processing system 14 determines an optimally minimum set of channels from the secondary imaging system 27 which are referred to as, "set a" in this particular example. The spectral processing system 14 has a stored error tolerance, e, and also determines a second transform t which is used to transform the data to spectra for imaging. The spectral processing system 14 performs an iterative optimization determining a matrix which when applied to the captured pixel data from a set of channels, the closest reconstruction of the highly accurate spectra may be realized. The set with the smallest number of channels which can approximate the highly accurate spectra across all captured pixels within an average spectral RMS difference that is less than the error tolerance e is chosen as the optimal set. Transform t includes the derived matrix associated with this optimally minimum set of channels, set a. The spectral processing system 14 transmits instructions to imaging system 12 to capture the image using the optimally minimum set of channels, set a.

In step 42', the imaging system 12 continues to captures spectral data for scene using the current optimally minimum set of channels, set a. Since the other steps in FIG. 4 with like numbers to those in FIG. 3 are identical to those steps as described earlier, they will not be discussed again here.

Figure 5:
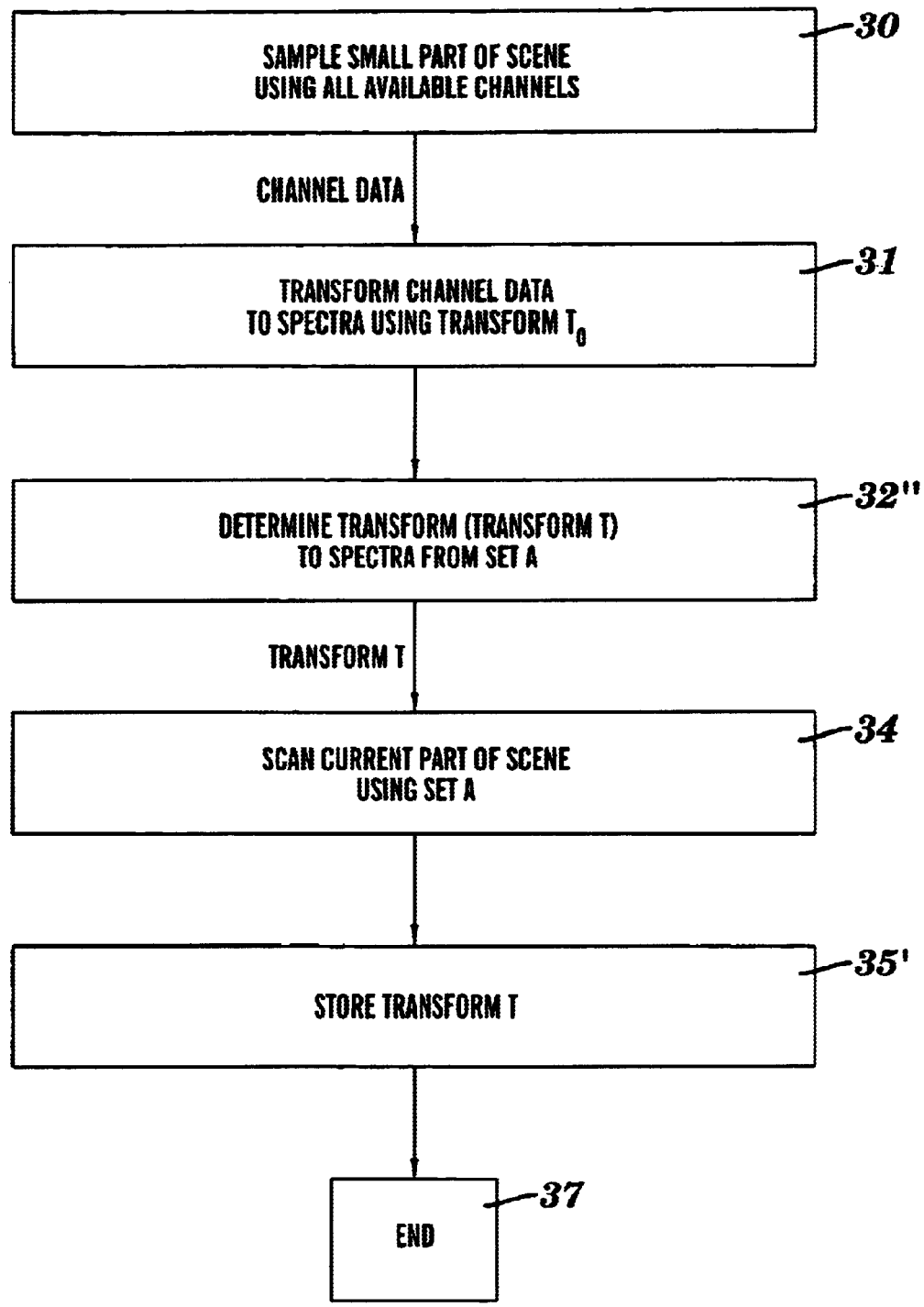
FIG. 5 is a flow chart of a method for spectral imaging in accordance with a fourth embodiment of the present invention.

A system 10 and method for spectral imaging in accordance with a fourth embodiment of the present invention is also identical to the one described above and illustrated in FIGS. 1 and 2, except as described below and illustrated in FIG. 5. This particular embodiment describes a method for capture of still spectral images where there is a primary imaging system 12 with a fixed set of channels available for capture at all times and a secondary imaging system 27 of little spatial extent, but with high spectral resolution. Unlike the embodiment described in FIG. 3, the primary imaging system 12 is not configurable in this particular embodiment and it is only the transform to spectra which can be updated periodically Referring to FIG. 5, in step 32" the spectral processing system 14 determines a second transform t which is used to transform the channel data to spectra for imaging. In step 35', the spectral processing system 14 stores the transform t in storage 26, although the transform can be stored elsewhere, such as in memory 18. Since the other steps in FIG. 5 with like numbers to those in FIG. 2 are identical to those steps as described earlier, they will not be discussed again here.

As these particular embodiments illustrate, the present invention improves data overload problems previously associated with spectral imaging by only taking the optimal minimal set of data for every object in or portion of a scene. By reducing the data, the system 10 and method are faster and lower cost than prior spectral imaging systems and have lower bandwidth demands. Further, the present invention has the self-adapting capability to react to the scene it is imaging or to adapt to trends detected over time from scenes it has been imaging, in order to select optimal minimum channel sets or to make optimal use of its given channels for data-efficient scene spectral reconstruction.

The present invention can be used in a variety of different types of applications, such as scanning images of fine-arts paintings or for capturing spectral moving images. Color reproduction systems that incorporate the present invention would benefit from the capture of spectral information because they can accurately simulate the effect of changing lighting in the taking environment or can overcome problems in changing lighting in the viewing environment. In many potential applications of the present invention, through spectral analysis, the chemical composition of points in a scene can be assessed creating opportunities for the exploitation of this information. For example the present invention could be used in a consumer camera system. Here, spectral analysis of the scene would enable the location of important object classes such as faces, synthetic clothing, etc. all of which could be of use in a secondary analysis. Among uses for such secondary analysis could be the improvement of final image quality or could be the cataloging of images according to scene content. Other examples include commercial ID systems and surveillance systems that would likewise have new capabilities because image objects could be segmented according to spectral signatures. In another example, the present invention could be used in a motion picture film restoration system. Taking advantage of prior knowledge of expected material composition and deterioration characteristics for motion picture film, the spectral information captured by the system 10 as described above could be subsequently analyzed to determine which spectral aspects were signatures of original colorant levels and which spectral aspects were signatures of deterioration artifacts to be removed during the restoration process.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention.

What is claimed is:

1. A method for spectral imaging, the method comprising:

capturing high spectral resolution data of at least a first portion of a first scene using a first plurality of channels;

determining a first set of channels from a second plurality of channels which can reconstruct spectra of the first portion of the first scene to satisfy a first error criterion when compared with the captured high spectral resolution data, wherein the first set of channels from the second plurality of channels comprises a smallest number of the plurality of channels which can be used to reconstruct spectra of the first portion of the first scene to satisfy a first error criterion when compared with the captured high spectral resolution data, wherein the determining further comprises performing an iterative optimization to determine a first set of channels from a second plurality of channels which can reconstruct spectra of the first portion of the first scene to satisfy a first error criterion when compared with the captured high spectral resolution data; and capturing pixel data of at least a second portion of at least the first scene using the first set of channels.

2. The method as set forth in claim 1 wherein the first set of channels from the second plurality of channels comprises a first stored number of the plurality of channels or a subset of the first stored number of the second plurality of channels which can be used to reconstruct spectra of the first portion of the first scene to satisfy a first error criterion when compared with the captured high spectral resolution data.

3. The method as set forth in claim 1 further comprising determining a first transform from the first set of channels which can reconstruct spectra.

4. The method as set forth in claim 3 further comprising reproducing the image spectra using the first transform and the captured pixel data from the at least a second portion of at least the first scene.

5. The method as set forth in claim 3 further comprising storing the first transform.

6. A method for spectral imaging, the method comprising:

capturing high spectral resolution data of at least a first portion of a first scene using a first plurality of channels;

determining a first set of channels from a second plurality of channels which can reconstruct spectra of the first portion of the first scene to satisfy a first error criterion when compared with the captured high spectral resolution data;

capturing pixel data of at least a second portion of at least the first scene using the first set of channels;

determining a first transform from the first set of channels which can reconstruct spectra;

at least once capturing high spectral resolution data of at least a third portion of a second scene;

capturing pixel data of the at least a third portion of a second scene using the first set of channels;

reconstructing estimated spectra by applying the first transform to the captured pixel data;

comparing the high spectral resolution data with the reconstructed estimated spectra to determine an intermittent error;

determining a second set of channels from the second plurality of channels which can reconstruct spectra of the third portion of the second scene to satisfy the first error criterion when compared with the captured high spectral resolution data if the intermittent error does not satisfy a second error criterion; and capturing pixel data of at least a fourth portion of any remaining portion of at least the second scene using the second set of channels.

7. The method as set forth in claim 6 wherein the first and second error criteria are the same.

8. The method as set forth in claim 6 further comprising capturing high spectral resolution data of the third portion of the second scene using the first plurality of channels.

9. The method as set forth in claim 6 wherein the second set of channels from the second plurality of channels comprises a first stored number of the plurality of channels or a subset of the first stored number of the plurality of channels which can be used to reconstruct spectra of the third portion of the second scene to satisfy a second error criterion when compared with the captured high spectral resolution data.

10. The method as set forth in claim 6 further comprising determining a second transform from the second set of channels which can reconstruct spectra.

11. The method as set forth in claim 10 further comprising reproducing the image spectra using the first and second transforms from the first and second sets of channels and the captured pixel data from the at least a second and fourth portions of at least the first and second scenes.

12. The method as set forth in claim 10 further comprising storing the second transform.

13. The method as set forth in claim 1 further comprising storing the captured pixel data from the first set of channels from the second portion of the first scene.

14. The method as set forth in claim 6 further comprising storing the captured pixel data from the second portion of the first scene such that the captured pixel data from the second portion of the first scene remains associated with the first transform.

15. The method as set forth in claim 6 further comprising storing the captured pixel data from the second set of channels from the at least a fourth portion of at least the second scene.

16. The method as set forth in claim 14 further comprising storing the captured pixel data from the fourth portion of the second scene such that the captured pixel data from the fourth portion remains associated with the second transform.

17. The method as set forth in claim 1 wherein the first error criterion requires that the reconstructed spectra of the first portion of the first scene be within a first error tolerance from the captured high spectral resolution data or that the reconstructed spectra of the first portion of the first scene be associated with a minimum value for a predetermined metric when compared with the captured high spectral resolution data.

18. The method as set forth in claim 7 wherein the second error criterion requires that the reconstructed spectra of the third portion of the second scene be within a second error tolerance from the captured high spectral resolution data or that the reconstructed spectra of the third portion of the second scene be associated with a minimum value for a predetermined metric when compared with the captured high spectral resolution data.

19. A method for spectral imaging, the method comprising:

capturing high spectral resolution data of at least a first portion of a first scene using a first plurality of channels;

determining a first set of channels from a second plurality of channels which can reconstruct spectra of the first portion of the first scene to satisfy a first error criterion when compared with the captured high spectral resolution data;

capturing pixel data of at least a second portion of at least the first scene using the first set of channels;

determining which aspects of the captured estimated spectral resolution data are signatures of original color levels and which aspects of the captured estimated spectral resolution data are signatures of deterioration artifacts based on stored image information; and correcting the aspects of the captured estimated spectral resolution data which are signatures of deterioration artifacts.

20. The method as set forth in claim 1 wherein the number of the first plurality of channels and the second plurality of channels are identical.

21. A system for spectral imaging, the system comprising:

an imaging system that captures high spectral resolution data of at least a portion of a first scene using a first plurality of channels; and a spectral processing system that determines a first set of channels from a second plurality of channels which can reconstruct spectra of the first portion of the first scene to satisfy a first error criterion when compared with the captured high spectral resolution data, wherein the first set of channels from the plurality of channels comprises a smallest number of channels which can be used to reconstruct spectra of the first portion of the scene to satisfy a first error criterion when compared with the captured high spectral resolution data, wherein the imaging system captures pixel data of at least a second portion of at least the first scene using the first set of channels, wherein the spectral processing system performs an iterative optimization to determine a first set of channels from a second plurality of channels which can reconstruct spectra of the first portion of the first scene to satisfy a first error criterion when compared with the captured high spectral resolution data.

22. The system as set forth in claim 21 wherein the first set of channels from the first plurality of channels comprises a first stored number of the plurality of channels or a subset of the first stored number of the plurality of channels which can be used to reconstruct spectra of the first portion of the first scene to satisfy a first error criterion when compared with the captured high spectral resolution data.

23. The system as set forth in claim 21 wherein the spectral processing system determines a transform from the first set of channels and the imaging system reproduces the image using the transform and the captured pixel data.

24. The system as set forth in claim 21 wherein the spectral processing system stores the transform from the first set of channels.

25. A system for spectral imaging, the system comprising:

an imaging system that captures high spectral resolution data of at least a portion of a first scene using a first plurality of channels; and a spectral processing system that determines a first set of channels from a second plurality of channels which can reconstruct spectra of the first portion of the first scene to satisfy a first error criterion when compared with the captured high spectral resolution data, wherein the imaging system captures pixel data of at least a second portion of at least the first scene using the first set of channels;

wherein the spectral processing system compares at least once the high spectral resolution data for a second portion of a second scene against the estimated spectral resolution data captured using the first set of channels for the second portion of the second scene to determine an intermittent error, the spectral processing system determines a second set of channels from the second plurality of channels which can reconstruct spectra of the second portion of the second scene to satisfy the first error criterion when compared to the captured high spectral resolution data if the intermittent error is greater then a second error tolerance, and the imaging system captures pixel data of at least a portion of any remaining portion of at least the second scene using the second set of channels.

26. The system as set forth in claim 25 wherein the imaging system captures high spectral resolution data of the second portion of the image using the first plurality of channels.

27. The system as set forth in claim 25 wherein the spectral processing system determines a second transform from the second set of channels and the imaging system reproduces the image using the first and second transforms and the pixel data captured using the first and second sets of channels.

28. The system as set forth in claim 25 wherein the spectral processing system determines a transform from the first set of channels and stores the transform and the pixel data captured using the first and second sets of channels.

29. The system as set forth in claim 25 wherein the spectral processing system determines which aspects of the captured estimated spectral resolution data are signatures of original color levels and which aspects of the captured estimated spectral resolution data are signatures of deterioration artifacts based on stored image information and wherein the spectral processing system corrects the aspects of the captured estimated spectral resolution data which are signatures of deterioration artifacts.

30. The system as set forth in claim 21 wherein the number of the first plurality of channels and the second plurality of channels are identical.

31. A method for spectral imaging, the method comprising:

capturing a first high spectral resolution data of at least a first portion of a first scene using a plurality of channels;

capturing pixel data of at least a second portion of a first scene using a first set of channels from the first plurality of channels;

determining a first transform based on the first set of channels and the first high spectral resolution data;

generating an image of the first scene using the transform and the captured pixel data;

capturing high spectral resolution data of at least a second portion of a second scene using a plurality of channels;

applying the first transform to the pixel data from the first set of channels to the second portion of the second scene to produce spectral estimates;

compare the spectral estimates to the high spectral resolution data to determine an intermittent error; and determining a second transform based on the first set of channels and the second high spectral resolution data if the intermittent error is greater than a first error tolerance.

32. The method as set forth in claim 31 further comprising recording the generated image on a media.

33. The method as set forth in claim 31 further comprising storing the generated image.

34. A system for spectral imaging, the system comprising:

a first imaging sub-system that captures a first high spectral resolution data of at least a first portion of a first scene using a plurality of channels;

a second imaging sub-system that captures pixel data of at least a second portion of a first scene using a first set of channels from a plurality of channels; and a spectral processing system that determines a first transform based on the first set of channels and the first high spectral resolution data generates the image of the first scene using the transform and the captured pixel data;

wherein the first imaging sub-system captures high spectral resolution data of at least a portion of a second scene using a plurality of channels and wherein the spectral imaging system applies the first transform to the pixel data from the first set of channels of the at least a portion of the second scene producing spectral estimates, compares the spectral estimates to the high spectral resolution data to determine an intermittent error and determines a second transform based on the first set of channels and the second high spectral resolution data if the intermittent error is greater than a first error tolerance.

35. The system as set forth in claim 34 wherein a recording system records the generated image on a media.

36. The system as set forth in claim 34 wherein the spectral processing system stores the generated image.

37. The system as set forth in claim 34 wherein the first and second imaging sub-system are the same imaging system.

38. The system as set forth in claim 21 wherein the imaging system further comprises:

a first imaging system that captures the high spectral resolution data of at least the portion of the first scene using the plurality of channels; and a second imaging system captures the pixel data of the scene using the first set of channels.

* * * * *